United States Patent [19]

Kletecka et al.

[11] Patent Number: 4,929,653
[45] Date of Patent: * May 29, 1990

[54] STABILIZED PIGMENTED POLYPROPYLENE FIBER RESISTANT TO GAS FADE

[75] Inventors: George Kletecka, Fairview Park; John T. Lai, Broadview Heights; Pyong N. Son, Akron, all of Ohio

[73] Assignee: The BF Goodrich Company, Akron, Ohio

[*] Notice: The portion of the term of this patent subsequent to Dec. 16, 2003 has been disclaimed.

[21] Appl. No.: 73,244

[22] Filed: Jul. 13, 1987

[51] Int. Cl.$^5$ ................................................. C08K 5/34
[52] U.S. Cl. ...................................... 524/96; 524/100; 428/396
[58] Field of Search ................... 524/100, 96; 428/396

[56] References Cited

U.S. PATENT DOCUMENTS

4,629,752 12/1986 Layer et al. ........................ 524/100

Primary Examiner—Kriellion Morgan
Attorney, Agent, or Firm—Alfred D. Lobo; Alan A. Csontos

[57] ABSTRACT

Excellent stabilization of pigmented polypropylene (PP) fiber against gas fade upon exposure to atmospheric pollutants is obtained with a hindered amine containing a polysubstituted piperazin-2-one (PSP) moiety, for example, a $C_2$-$C_{12}$ alkylene connecting two PSP moieties, or a trisubstituted triazine ring with three PSP substituents, or a polyalkylene polyamine having pendant substituted oxo-piperazinyl-traizine moieties (PIP-T), that is, having pendant triazine rings substituted with PSP substituents. The stabilizers are unexpectedly effected when used without an antioxidant which produces yellowing, if used. Either pigmented or unpigmented PSP-stabilized PP fibers, and particularly fibers pigmented with white or pastel dyes, and having a non-alkaline "finish" are especially benefitted. Fibers made from PP stabilized with such a hindered amine, but lacking conventional antioxidants, have improved gas fade resistance, compared to fibers made from PP stabilized with several other commercially available hindered amines tested, including those which contain heterocyclic amines which are not PSPs, and especially those amines containing a hindered phenol moiety.

2 Claims, 2 Drawing Sheets

FIG. 2

STABILIZED PIGMENTED POLYPROPYLENE FIBER RESISTANT TO GAS FADE

BACKGROUND OF THE INVENTION

The present invention relates to pigmented fibers of polypropylene (PP) and copolymers of propylene with a minor amount of a copolymerizable alpha-olefin monomer such as ethylene (P-co-E), individually and collectively referred to herein as "propylene polymer" for convenience "PP", which, upon exposure to atmospheric pollutants, is resistant to "gas fade". Gas fade is evidenced by objectionable color. More particularly, the invention relates to PP fiber essentially free of a hindered phenol anti-oxidant and pigmented with a white pigment or with a lightly colored pigment. By "essentially free" I refer to the fact that the only antioxidant which may be present is that added to the polymerization reactor in which PP is polymerized, to facilitate the drying and processing of the PP. This invention was born of the need for protecting the effect of the pigment in PP fiber made from general purpose PP.

Recent advances in PP fiber technology have been instrumental in propagating use of the fiber for fabric used in a wide variety of applications in many of which the conditions of exposure of the fabric are conducive to gas fade (of the fabric). Such fabric is used in the automobile industry for upholstery, headliners, trim and carpets. The fabric for trim is typically non-woven. Much of the interior of an automobile uses needle-punched fabric, and the major portion includes woven, knit or tufted structures. Needle-punched non-wovens offer economic advantages and when combined with pigmented PP fibers, may provide good resistance to fading of the color under the elevated temperature conditions typically encountered in an automobile and other applications where such PP fibers are used.

The problem is that PP is degraded under the action of oxygen and light, particularly ultraviolet (uv) light, even when thermal degradation is not a consideration. Currently, commercially available unpigmented, uv-stabilized PP fiber develops an objectionable yellow color upon exposure to atmospheric pollutants including nitrogen oxides. This development of yellow color affects the color provided by the pigment. Upon exposure to light, PP fiber also suffers a severe loss of physical integrity over time, the higher the intensity of light, the worse the degradation. For light stabilization, conventionally used stabilizers are of the hindered amine, benzophenone, benzotriazole, and cyanoacrylate types, inter alia. Oxidative degradation is conventionally combatted by the addition of antioxidants to the PP. Among these are the hindered phenols, sulfur-containing and phosphite type antioxidants.

Despite such stabilizing efforts, PP fabric made with pigmented PP fiber stabilized with an antioxidant, is particularly susceptible to yellowing caused by nitrogen oxides in waste gases, especially those from industrial plants, automobiles and burning of oil in oil stoves. The yellowing is easily noticeable upon storage of PP fabric at room temperature, the longer the storage period, the worse the yellowing. We recently realized that it was because of the necessary stabilization against degradation by oxygen, heat and light, that the yellowing of PP fibers, exposed to atmospheric pollutants, persisted. We have now resolved this problem so that yellowing is minimal, by the choice of a particular type of hindered amine uv-stabilizer, provided essentially no antioxidant is present in the PP fiber.

Though considerable effort was devoted, in the recent past, to the study of the details of the mechanisms and kinetics of oxidative and light degradation, and the yellowing of PP fibers, particularly those stabilized with hindered phenol type antioxidants, it was never suspected that the presence of a hindered phenol moiety, typically present in an antioxidant, contributed to the yellowing of the fibers. Of course, the problem was exacerbated when the PP fibers of the fabric were pigmented with white (Titanox) pigment, or a pale pigment in which the light color is commonly contributed by any one of a wide array of dyes. Pastel colors, and azo dyes which provide the colors, are highly favored for their cosmetic appeal.

We have now found that the resistance of pigmented PP fiber to the peculiar yellowing due to nitrogen oxides, known as "gas fade" is unexpectedly improved by the use of a certain type of hindered amine stabilizer provided that a phenol-containing antioxidant be absent, or be maintained at a very low level solely to assist in processing the resin, the level preferably being less than about 0.05 parts per hundred parts (phr), or less than 500 parts per million (ppm) of PP. Additives other than an antioxidant may be added to facilitate processing, if the color they contribute is desirable, and they do not degrade the physical properties of the PP. Such additives may include lubricants in addition to alkaline earth metal stearates, near-colorless or white fillers such as glass fibers or talc, and optical brighteners.

European Patent No. GB 0,197,793 discloses that PP was stabilized against gas fade by incorporating a specific phenolic type antioxidant (AO) containing a tetraoxaspiro undecane structure, in the PP resin. But we have found any antioxidant to be contraindicated for improving resistance of pigmented PP fiber to gas fade.

We have now found further evidence that hindered amines with a specific structure, which amines exhibit excellent uv stabilization in numerous host polymers without notably distinguishing one polymer from another as far as their relative susceptibility to uv stabilization is concerned, are also surprisingly effective to stabilize PP against gas fade. Moreover, the evidence is that these amines are effective when used without an AO of any kind, except for the trace amounts, less than 100 ppm, which might be used in the manufacture of the PP resin, to improve its stability during processing. Since some of these amines are better uv stabilizers than other such amines, but make the PP fibers more susceptible to yellowing, it is most preferred to use a mixture of the amines for optimum results.

The peculiarly distinguishing structural feature of such effective hindered amines having such a beneficial effect on resistance to gas fade, is that they contain, as an essential portion of their basic structure, a polysubstituted (hereafter also referred to as "substituted" for brevity) piperazin-2-one (PSP) having an $N^1$-adjacent carbonyl, and at least the $C^3$ atom (carbon atom in the 3-position in the ring) has two substituents (hence "polysubstituted"), which may be cyclizable, that is, form a cyclic substituent.

Though such compounds, referred to in U.S. patents listed herebelow, were known to be excellent UV stabilizers in colorless organic materials when used in combination with AOs, there was nothing to suggest that their incorporation in PP, and in nylon and polyester fibers to a lesser extent, among a wide array of other polymers, in the absence of an AO, and preferably also in the absence of a hindered phenol, phosphite or thioester stabilizer, would provide effective stabilization against gas fade.

SUMMARY OF THE INVENTION

It has been discovered that known hindered amines containing at least one and, preferably from 2 to about 12 polysubstituted piperazin-2-one (PSP) moieties, for example, a hindered amine in which a (i) triazine ring is substituted at each of its three ring carbon atoms with a substituent containing a PSP moiety, or, (ii) $C_2-C_{12}$ alkylene connects two PSP moieties, or, (iii) polyalkylene polyamine having pendant substituted oxopiperazinyltriazine moieties (PIP-T), that is, having pendant triazine rings substituted with PSP substituents, is a highly effective stabilizer against gas fade so prevalent in fibers of propylene polymers ("PP") subjected to an environment containing nitrogen oxides; and, that fabric made from pigmented PP fibers stabilized with such a hindered amine, has improved discoloration resistance, compared to articles made from pigmented PP fibers stabilized with several other commercially available hindered amines tested, even if such amines have structures which are substantially free from a phenolic moiety.

It is therefore a general object of this invention to provide a method for imparting improved discoloration resistance ("gas fade resistance") to stabilized pigmented PP fibers exposed to nitrogen oxides, which method comprises incorporating into said PP essentially free of an AO, an effective amount sufficient to attenuate gas fade of the polypropylene fiber due to nitrogen oxide gases, of a hindered amine stabilizer containing a PSP moiety, said amount being sufficient to decelerate yellowing of the PP.

The particular discovery that pigmented PP fiber when conventionally stabilized, to make use of the fiber in the ambient atmosphere practical, with a known uv-light stabilizer and AO, is peculiarly susceptible to yellowing, provided the impetus to find a light stabilizer which would be effective without an AO.

It is a specific object of this invention to provide a method for stabilizing pigmented fiber made from PP, which method comprises, subjecting said fiber to nitrogen oxides for a time sufficient to produce gas fade in an article made with the fiber; said PP being essentially free of an AO, and having incorporated therein from 20 parts per million (ppm) to about 2.0%, preferably from 0.1% to 0.5%, based upon the weight of the PP in the article, of a hindered amine stabilizer selected from the group consisting of (i) a bis-compound consisting of a $C_2-C_{12}$ alkylene connecting two PSP moieties, and (ii) a polyalkylene polyamine having pendant triazine rings with PSP substituents.

BRIEF DESCRIPTION OF THE DRAWINGS

The foregoing and other objects and advantages of my invention will appear more fully from the following description, made in connection with the accompanying figures graphically illustrating the effect of subjecting fabric samples of pigmented PP fiber to a ASTM E313-73 test for gas fade due to nitrogen oxides generated in a test chamber. The identically spun PP fiber, except for the type of finish on the fiber, contains the particular combination of hindered amine and pigment, but is essentially free of an AO.

DETAILED DESCRIPTION OF PREFERRED EMBODIMENTS

Various considerations relating to the "gas fade resistance" of fabrics are discussed in "Why Do White Fabrics and Garments Turn Yellow During Storage in Polyethylene Bags and Wrappings? " by Kenneth C. Smeltz, Textile Chemist and Colorist, Vol 15, No 4, April 1983, pp 17-21. Specific considerations relating to the use of pigments in PP fibers are discussed in "Influence of Pigments on the Degradation of Polypropylene Fibers on Exposure to Light and Weather" by Steinlin, F. and Saar, W., Melliand Textilberichte, Nov 1980, pp 1465-70. A detailed overall analysis of various aspects of yellowing is discussed in a compendium of articles titled "Update on Yellowing" *Textile Progress* Vol.15, No.4 (published by Textile Institute 1987).

The "yellowing" is particularly noticeable on pigmented white, or near-white fibers. To avoid the particular effect of a chosen pigment, we investigated the yellowing effect on unpigmented water-white PP fiber, recognizing that this yellowing effect would be superimposed on the color resulting from the less-than-complete effectiveness of the particular PSP-containing hindered amine, or other u-v stabilizer used. It should also be noted that the overall color difference between exposed and unexposed samples is the vector sum of the changes in the red to green, the yellow to blue, and the lightness directions, all of which are expressed in hunter units (see "Predicting the Effects of Weathering on Color" by W. R. Matthew *Plastics Engineering* May 1986 pp 35-37).

In a particular embodiment, this invention provides fibers made from pigmented propylene polymer (PP) stabilized against degradation by uv-light, which fibers are subjected to exposure to nitrogen oxides under conditions which cause the fibers to yellow. Incorporated in the polymer, and preferably uniformly distributed therein, in addition to the pigment and a lubricant or processing aid, is a small amount, from about 20 ppm to about 2.0% by weight (based on the weight of all the polymer from which the article is formed), and more preferably from about 0.1 phr to about 0.5 phr, of a hindered amine stabilizer containing a polysubstituted piperazinone (PSP). Details for preparation of numerous hindered amines containing a PSP moiety are disclosed in U.S. Pat. Nos. 4,167,512; 4,190,571; 4,207,228; 4,240,961; 4,246,412; 4,297,497; 4,292,240; 4,297,497; 4,415,684; 4,466,915; 4,480,092; 4,547,538; 4,629,752 and 4,639,478; inter alia, the disclosures of which are incorporated by reference thereto as if fully set forth herein. The PP fiber, free of the PSP stabilizer, is much less susceptible to yellowing than the fiber which has been stabilized with the PSP.

The PSP moiety is found in stabilizers which belong to a class of compounds comprising hindered amines, and their acid addition salts, in which the PSP moiety is represented as follows:

wherein,

R¹ represents hydrogen, oxygen, $C_1$–$C_{18}$ alkyl, $C_1$–$C_6$ hydroxyalkyl, $C_2$–$C_{12}$ acyl including benzoyl, $C_3$–$C_8$ alkenyl, $C_3$–$C_8$ alkynyl, $C_7$–$C_{12}$ aralkyl which is unsubstituted or substituted in the alkyl moiety by hydroxyl, or $C_1$–$C_8$ alkanoyl or $C_3$–$C_5$ alkenoyl;

R², R³, R⁴ and R⁵ independently represent hydrogen, $C_1$–$C_{24}$ alkyl, $C_1$–$C_{12}$ hydroxyalkyl, $C_1$–$C_{12}$ haloalkyl, $C_1$–$C_{12}$ cyanoalkyl, $C_2$–$C_{12}$ aminoalkyl or iminoalkyl, $C_3$–$C_{18}$ ether groups, $C_4$–$C_{18}$ hydroxyalkyl ether or cyanoalkyl ether groups, $C_7$–$C_{14}$ alkenyl or aralkyl, $C_2$–$C_7$ alkylene, and which in combination, one with another, represent $C_5$–$C_{14}$ cycloalkyl at least four of which C atoms are cyclized, and, optionally containing a keto, ester, amide, ether, thio or hydroxy group; but, only one of R² and R³, and only one of R⁴ and R⁵ may be hydrogen; and, R⁶ represents a free valency through which the PSP moiety is connected to the remaining structure of the stabilizer. When a PSP is not a substituent, R⁶ typically represents H or CH₃.

Specific examples of such stabilizers containing a PSP moiety are identified by the following code numbers and structures, in which C atoms, CH or CH₂ groups at the intersection of lines are not otherwise identified, and projecting lines (for substituents) represent CH₃ groups. Most preferred are structures in which a triazine ring is provided with substituents having a PSP moiety, for example, the compounds having the structures identified as GR-3150, X-134 and X-141.

GR-3150

7963-347
GR-3034

7956-796

7956-548

7957-722 R =

7956-678

7956-670
X-141

Et = C₂H₅

7956-518 R =

7956-524

X-134

7956-580

7956-586

7956-602

7956-608

The propylene polymer is typically polypropylene, but may be a random or block copolymer of propylene and a monoolefinically unsaturated monomer X (P-co-X) with up to about 10% by wt of X wherein X represents vinyl acetate, or a lower $C_1$–$C_4$ alkyl acrylate or methacrylate. Blends of such propylene polymers with a minor amount of another polymer such as polyethylene are also included within the scope of this invention. For convenience, homopolymer PP and copolymer P-co-X are together referred to herein as "propylene polymer" PP. The PP has a number average mol wt Mn in the range from about 10,000 to about 500,000, preferably about 30,000 to about 300,000 with a melt flow index from 0.1 to 30 g/10 min when measured according to ASTM D-1238.

Though prior art stabilized polyolefins may include an impact modifier, there is no impact modifier in the stabilized propylene polymer used to thermoform our article. The use of impact modifiers help stabilize the propylene polymer by desensitizing it, but conventional impact modifiers, for example, ethylene-propylene-diene terpolymer rubber, styrene-butadiene-styrene block copolymers, and the like, are highly undesirable from the standpoint of color.

For the same reason, namely, the contribution of known antioxidants to undesirable color, our stabilized PP is essentially free of an antioxidant, though prior art compositions utilize them to enhance stability upon exposure to uv-radiation.

Solely for the purpose of facilitating the spinning of PP, a metal stearate such as calcium or zinc stearate in an amount insufficient to deleteriously affect the color of the propylene polymer, preferably in the range from about 10 ppm to about 150 ppm, may be blended into the PP.

More important, all PP fibers are provided with a surface "finish" comprising an alkoxylated lubricant and a phosphate ester, and optionally, additives such as bactericides and antistats, which are effective because they tend to concentrate on the surface of the fibers. A description of ethoxylated lubricants is given in Kirk-Othmer, *Encyclopedia of Chemical Technology,* 2nd Edition 19, 531–554 (1969), and of the polyethylene glycols, etc. in 10, 654–659, id. Commonly favored finishes are of the lubricant type selected from ethoxylated sorbitol esters, fatty acid, fatty acid amides, fatty acid esters, random copolymers of the monobutyl ether of poly(oxyethyleneoxy1,2-propylene), the methyl ether of poly-(oxyethyleneoxy1,2-propylene) laurate, etc. to which is added a phosphate type antistatic material such as hydrocarbyl phosphate esters, ethoxylated hydrocarbyl phosphate esters, partially hydrolyzed hydrocarbyl phosphate esters, or their salts. Commercially available finishes are Napcostat, available from Diamond Shamrock Corp., and particularly finishes such as those described in U.S. Pat. No. 4,185,004 or European Patent Publication No. 0 184 191 filed Mar. 12 1985, relevant portions of the disclosures of which are incorporated by reference thereto as if fully set forth herein. Test samples of pigmented fiber were prepared with a Napcostat finish, and a finish, designated "P-7" prepared as generally disclosed in the foregoing disclosures.

Since a predominant concern is the unwanted development of yellow color, the PSP-containing stabilizer is particularly beneficial in fibers where no pigment has been added to the normally water white PP. However, if the fibers are to be pigmented with an opaque white pigment, or a pastel color is desired, for example, with pink and blue azo dyes, the resistance to gas fade is much improved by the PSP-containing stabilizer. Blue may also be obtained with a phthalocyanine pigment, but in all cases, the amount of pigment added is sufficient to provide the desired color, but insufficient adversely to affect the uv-stabilization provided by the PSP-containing stabilizer.

The PSP-containing stabilizer may readily be incorporated into the PP by any conventional technique at a convenient stage prior to the manufacture of the fiber from the PP. For example, the stabilizer may be mixed with the PP in the melt, which is then spun into fibers in the range from about 8 denier to about 30 denier, most preferably about 10–15 denier.

The test for stability against gas fade determines the yellowing of fibers which have been subjected to combustion fumes of methane or propane gas in a standard test chamber, although any chamber in which the test specimens can be exposed to the fumes, such as the children's sleep wear test chamber described in DOC FF 3-71, would be acceptable. We have adapted the AATCC Gas Fading Test Chamber procedure for use in this test. The adaptation was developed and used by Chevron in the past and involves replacing the stock burner in the chamber with an ordinary Bunsen burner, sealing off all openings with aluminum foil, and closing the damper in the chimney. Natural gas (methane) is used for fuel.

Samples were prepared from treated PP fiber collected into yarn and woven into a fabric. The fiber is made by first making a concentrate which is let down. The concentrate is made by mixing the ingredients, namely some PP, pigment, calcium stearate and UV-stabilizer in a large jar. This concentrate is let down by mixing with 900 g of PP and enough pigment to impart the desired color. For the test samples the pigments were used in a concentration (usually from 0.1 phr to 1 phr, preferably from 0.2 to 0.75 phr) only sufficient to impart a pastel color. Pigments used are Red 144, Orange 31, Yellow 93 and Blue 15. The yellowing is masked by deeper colors. The mixture is shaken until thoroughly mixed then extruded at 260° C. and pelletized. For better uniformity this pelletized batch is again thoroughly shaken in a mixer, extruded and finally pelletized as before. These pellets are used to spin the fibers.

Pigmented fibers are spun at 490o to 510° F. through a 39-hole spinneret and coated at a 1% by wt level with a fiber finish. The fibers are then drawn at a 3:1 ratio and annealed at 110° C. A yarn is made by combining four of the multifilament bundles with a half-twist per inch into one yarn. This yarn is knitted on a Singer flat-bed manual knitting machine, Memo Metic (Model F-370). Pieces of this knitted fabric are used as the test samples.

The test is conducted as follows: A Bunsen burner equipped with a chimney is supplied with natural gas. The chamber is supplied by U.S. Testing Co. The burner is adjusted to give the coldest flame possible. The air intake to the burner is closed completely. The gas flame height is adjusted to maintain a temperature of 140° F. ±5°. The opening in the bottom chamber is sealed off with aluminum foil after the burner is adjusted. The damper in the top of the upper chamber is closed and the fabric samples are hung on bars in the upper chamber. The motor is started so as to rotate the samples during the exposure period of 6 hr.

Discoloration (yellowing) is not usually evident immediately after a single six-hour cycle of exposure at a preselected temperature (140° F. ±5° F.), so that all samples were tested over three cycles. The degradation of physical properties other than yellowing were not measured as there was no significant deterioration of tensile strength and per cent (%) elongation over three cycles.

An alternative is to dissolve the stabilizer in a suitable solvent such as methylene chloride, then solvent-blend the PP powder. After removal of the solvent by evaporation under reduced pressure, the stabilized PP formulation is extruded and pelleted before it is spun into fibers. In either event, the conditions of spinning the fibers, and the knitted fabric knitted from the filaments, or skeins formed from the filaments, whichever are to be used, are maintained the same for all samples.

The following examples serve to illustrate the invention.

Numerous fabric samples were woven from pigmented fibers prepared from Profax 6301 powder-blended with Castearate, an Orange 31 pigment, and varying concentrations (from 0.1 phr to 0.5 phr) of numerous PSP-containing stabilizers, including specifically the PSP-containing GR-3150 (commercially available from The B.F.Goodrich Company) without any added AO. It was found that the higher the concentration of uv-stabilizer, the greater the proclivity for yellowing, there being relatively little yellowing with no uv-stabilizer. The degree of yellowing also depends upon the type of finish on the fiber because there appears to be an interaction of the finish with the uv-stabilizer. Thus, a stabilizer may be better in combination with one finish, than with another.

The yellowness index (YI), and index of whiteness (WI), for each fabric sample is measured, before and after exposure to 3 cycles, with the same concentration (0.2 phr) of PSP-containing stabilizers in fibers with two different finishes, according to ASTM E313-73. The results of the measurements are set forth separately in Tables 1 and 2 for the two finishes. A YI below 10 indicates that the fabric sample is essentially water-white, progressively showing more color as the number increases. A YI of 11 is barely yellow to the naked eye only when compared to a water-white specimen. A YI of 15 is generally deemed quite acceptable in the context of this comparative test. The absolute yellowness as indicated by the YI is generally not of as great concern as the propensity of the YI to change. The absolute YI itself will depend upon such things as thickness of the material, the presence of other additives, the variation in wavelength of the light source, and the like.

In the following Table 1, the concentration of hindered amine in each case is 0.2 phr (parts per hundred parts resin), of white pigment is 0.7phr, of calcium stearate is 0.1 phr, and no antioxidant was added. Most preferred concentrations of hindered amine stabilizers in combination with pastel colored fibers is in the range from 0.2 to 0.5 phr.

The structures of the hindered amines corresponding to their coded identities is given hereinabove. The initial yellowness and whiteness indices $YI_{init}$ and $WI_{init}$ respectively are measured before exposure in the chamber, and the final indices $YI_f$ and $WI_f$ are measured after three (3) cycles in the chamber. The data are arranged in an ascending order of color, that is, increasing susceptibility to yellowing, the increasing color being evidenced by the values for $YI_f$ for the exposed samples increasing from the top to the bottom of the Table, and the values for $WI_f$ decreasing correspondingly. The values for a commercially available hindered amine stabilizer, namely Tinuvin 144, which contains both a hindered amine moiety and a hindered phenol moiety in its molecule, are presented for comparison, as evidence of the effect of a hindered phenol group on yellowing, assuming the piperidinyl group does not have a comparably deleterious effect.

Figure 1:
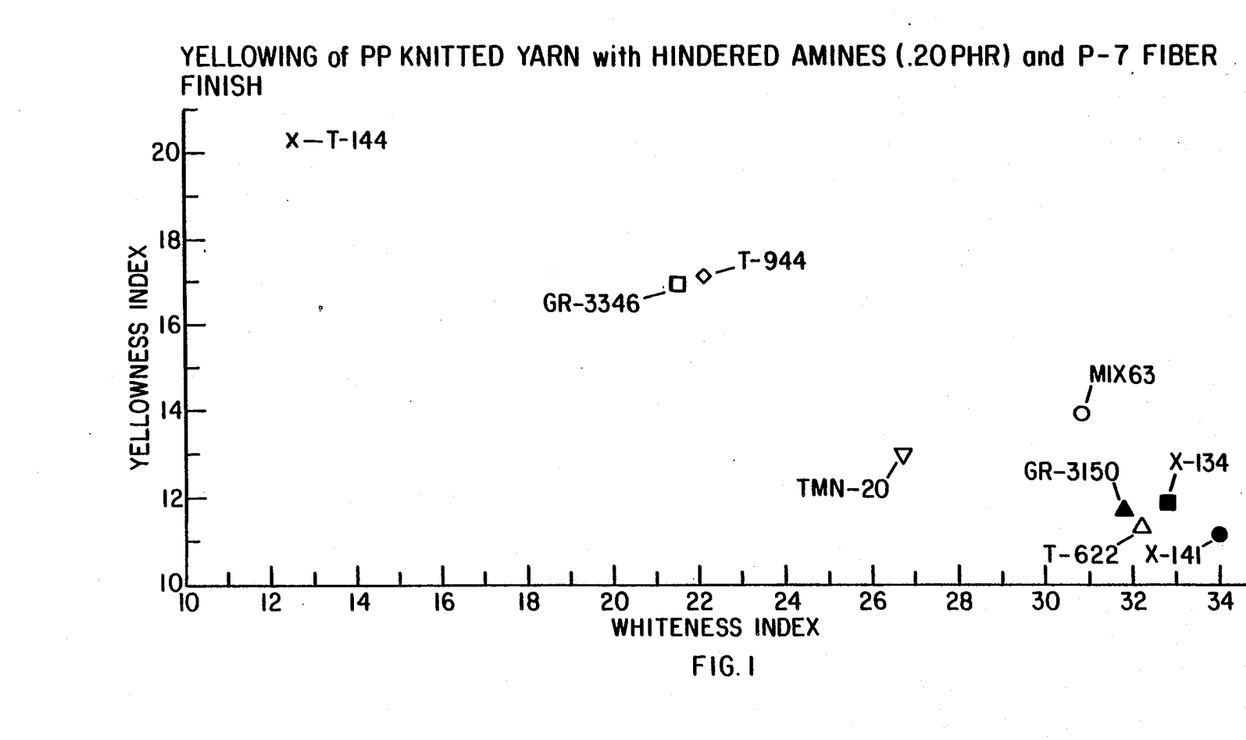
FIG. 1 is a plot of yellowness index vs. whiteness index for PP fiber with a Napcostat® 905M finish.
Figure 2:
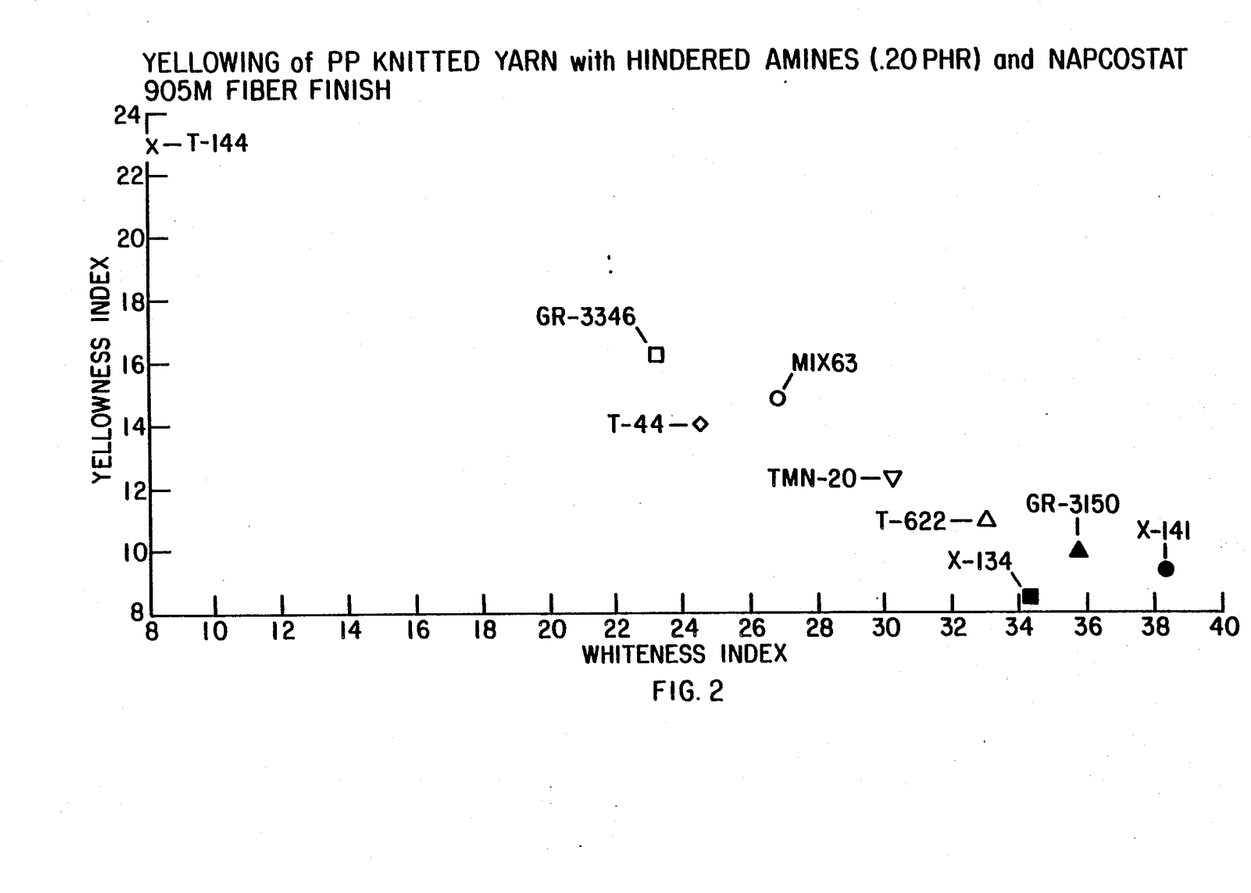
FIG. 2 is a plot of yellowness index vs. whiteness index for PP fiber with a "P-7" finish made with a recipe disclosed in prior art references.

The values for all samples are plotted in FIG. 1 for fibers coated with a commercially available Napcostat ® 905M finish; and in FIG. 2 for fibers coated with the P-7 finish.

TABLE 1

| | (Napcostat finish) | | | |
|---|---|---|---|---|
| Hindered amine | $YI_{init}$ | $WI_{init}$ | $YI_f$ | $WI_f$ |
| X-141 | 1.6 | 57.6 | 6.9 | 38.3 |
| X-134 | 2.3 | 52.9 | 8.5 | 34.3 |
| GR-3150 | 1.3 | 56. | 10. | 35.7 |
| T622 | 1.9 | 50.5 | 11. | 33. |
| TMN-20 | 1.9 | 54.3 | 12.2 | 30.2 |
| T-944 | 1.7 | 52.4 | 14 | 24.5 |
| MIX63 | 4.2 | 47.1 | 14.8 | 26.8 |
| GR-3346 | 1.5 | 55. | 16.2 | 23.2 |
| T-144 | 1.2 | 50.9 | 23 | 8.2 |

TABLE 2

| | (P-7 finish) | | | |
|---|---|---|---|---|
| Hindered amine | $YI_{init}$ | $WI_{init}$ | $YI_f$ | $WI_f$ |
| X-141 | 2.3 | 54.9 | 11.1 | 54.9 |
| T-622 | 2.6 | 52.8 | 11.3 | 32.2 |
| GR-3150 | 1.4 | 57.2 | 11.7 | 31.8 |
| X-134 | 1.1 | 57.3 | 11.8 | 32.8 |
| TMN-20 | 1.3 | 58.3 | 12.9 | 26.7 |
| MIX63 | 2.2 | 55.1 | 13.9 | 30.8 |
| GR-3346 | 1.8 | 56.3 | 16.9 | 21.5 |
| T-944 | 1.8 | 58.6 | 17.1 | 22.1 |
| T-144 | 2.3 | 51.4 | 20. | 12.5 |

Identification of codes:

T-622 represents Tinuvin ® 622 which is dimethyl succinate polymer with 4-hydroxy-2,2,6,6-tetramethyl-1-piperidineethanol.

T-144 represents Tinuvin ® 144 which is bis(1,2,2,6,6- pentamethyl-4-piperidinyl)butyl-(3,5-di-t-butyl-4-hydroxybenzyl)malonate.

GR-3346 represents Cyasorb ® 3346 which is poly[(6-morpho- lino-s-triazine-2,4-diyl][2,2,6,6-tetramethyl-4-piperidyl) imino]hexamethylene[(2,2,6,6-tetramethyl-4-piperidyl)imino)].

T-944 represents Chimasorb ® 944 which is poly[[6(1,1,3,3-tetramethylbutyl)amino]-s-triazine-2,4-diyl](2,2,6,6-tetramethyl-4-piperidyl)imino]hexamethylene[(2,2,6,6-tetramethyl-4-piperidyl)imino]].

MIX63 represents Mixxim ® 63 which is [1,2,2,6,6-penta- methyl-4-piperidyl-2,2,2',2'-tetramethyl-3,9-(2,4,8,10tetraoxaspiro(5,5)undecane)diethyl]-1,2,3,4-butanetetracarboxylate.

TMN-20 refers to Hostavin ® TMN-20 which is 2,2,4,4-tetra- methyl-7-oxa-3,20-diazadispiro[5.1.11.2-]heneicosane-21one.

We claim:

1. A method for imparting gas fade resistance to pigmented polypropylene fiber, which method comprises mixing into a melt of said polypropylene, which is essentially free of an antioxidant, an effective amount sufficient to attenuate gas fade of said polypropylene fiber due to nitrogen oxide gases, of a hindered amine stabilizer selected from the group consisting of (i) a triazine ring substituted at each triazine ring carbon atom with a PSP moiety (ii) a bis-compound consisting of a $C_2$-$C_{12}$ alkylene connecting two PSP moieties, and (iii) a polyalkylene polyamine having pendant triazine rings with substituents having at least one PSP moiety on each of the rings, said stabilizer containing as an essential portion of its basic structure a polysubstituted piperazin-2-one (PSP) moiety having the structure wherein,

$R^1$ represents hydrogen, oxygen, $C_1$-$C_{18}$ alkyl, $C_1$-$C_6$ hydroxyalkyl, $C_2$-$C_{12}$ acyl, $C_3$-$C_8$ alkenyl, $C_3$-$C_8$ alkynyl, $C_7$-$C_{12}$ aralkyl which is unsubstituted or substituted in the alkyl moiety by hydroxyl, or $C_1$-$C_8$ alkanoyl or $C_3$-$C_5$ alkenoyl;

$R^2$, $R^3$, $R^4$ and $R^5$ independently represent hydrogen, $C_1$–$C_{24}$ alkyl, $C_1$–$C_{12}$ hydroxyalkyl, $C_1$–$C_{12}$ haloalkyl, $C_1$–$C_{12}$ cyanoalkyl, $C_2$–$C_{12}$ aminoalkyl or iminoalkyl, $C_3$–$C_{18}$ ether groups, $C_4$–$C_{18}$ hydroxyalkyl ether or cyanoalkyl ether groups, $C_7$–$C_{14}$ alkenyl or aralkyl, $C_2$–$C_7$ alkylene, and optionally containing a phosphite, or ester group, and which in combination, one with another, represent $C_5$–$C_{14}$ cycloalkyl at least four of which C atoms are cyclized, and, optionally containing a keto, ester, amide, ether, thio or hydroxy group; but, only one of $R^2$ and $R^3$, and only one of $R^4$ and $R^5$ may be hydrogen;

and, $R^6$ represents a free valency through which the PSP moiety is connected to the remaining structure of the stabilizer;

and spinning said melt into fibers in the range from about 8 denier to about 30 denier.

2. The method of claim 1 wherein said hindered amine is represented by a structure selected from

* * * * *